United States Patent
Mityagin

(10) Patent No.: US 10,091,174 B2
(45) Date of Patent: Oct. 2, 2018

(54) IDENTIFYING RELATED USER ACCOUNTS BASED ON AUTHENTICATION DATA

(71) Applicant: Dropbox, Inc., San Francisco, CA (US)

(72) Inventor: Anton Mityagin, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/499,959

(22) Filed: Sep. 29, 2014

(65) Prior Publication Data

US 2016/0094529 A1 Mar. 31, 2016

(51) Int. Cl.
H04L 29/06 (2006.01)

(52) U.S. Cl.
CPC .......... H04L 63/08 (2013.01); H04L 63/1416 (2013.01)

(58) Field of Classification Search
CPC ....... G06F 21/31; H04L 63/08; H04L 63/083; H04L 9/32; H04L 63/0861
USPC ............................................................ 726/7
See application file for complete search history.

(56) References Cited

U.S. PATENT DOCUMENTS

| | | | | |
|---|---|---|---|---|
| 7,712,141 B1 * | 5/2010 | Agrawal | ................ | G06Q 30/02 713/168 |
| 8,131,685 B1 | 3/2012 | Gedalius et al. | | |
| 8,904,506 B1 * | 12/2014 | Canavor | ................. | G06F 17/30 713/182 |
| 9,027,094 B1 * | 5/2015 | Balazs | ................... | H04L 63/10 705/44 |
| 2003/0167402 A1 * | 9/2003 | Stolfo | .................... | H04L 51/12 726/23 |
| 2005/0259657 A1 * | 11/2005 | Gassoway | ........... | H04L 63/1408 370/392 |
| 2006/0069921 A1 * | 3/2006 | Camaisa | ................. | G06F 21/31 713/182 |
| 2007/0150951 A1 * | 6/2007 | Aaron | ................. | H04L 63/1433 726/22 |

(Continued)

FOREIGN PATENT DOCUMENTS

WO WO 2007117582 A2 * 10/2007 ............. G06F 21/56

OTHER PUBLICATIONS

Hershkop, Shlomo, "Behavior-based Email Analysis with Application to Spam Detection", Columbia University, 2006.

*Primary Examiner* — Harunur Rashid
*Assistant Examiner* — Sakinah White Taylor
(74) *Attorney, Agent, or Firm* — DLA Piper LLP US

(57) ABSTRACT

In some embodiments, upon detecting malicious activity associated with a user account, a content management system can identify other user accounts related to the malicious user account. The content management system can identify related user accounts by comparing authentication information collected for the malicious user account with authentication information collected for other user accounts. Authentication information can include IP address information, geographic information, device type, browser type, email addresses, and/or referral information, for example. The content management system can compare the content items associated with the malicious user account to content items associated with other user accounts to determine relatedness or maliciousness. After identifying related malicious user accounts, the content management system can block all related malicious user accounts.

19 Claims, 5 Drawing Sheets

(56) References Cited

U.S. PATENT DOCUMENTS

| | | | |
|---|---|---|---|
| 2008/0028444 A1* | 1/2008 | Loesch | G06F 17/30902 726/4 |
| 2011/0231645 A1* | 9/2011 | Thomas | H04L 9/321 713/150 |
| 2011/0252085 A1* | 10/2011 | Mase | H04N 5/44543 709/203 |
| 2012/0023565 A1* | 1/2012 | Tumanyan | G06F 21/41 726/8 |
| 2012/0084866 A1* | 4/2012 | Stolfo | G06F 21/554 726/25 |
| 2012/0124664 A1* | 5/2012 | Stein | G06F 15/16 726/22 |
| 2012/0297484 A1 | 11/2012 | Srivastava | |
| 2013/0185230 A1 | 7/2013 | Zhu et al. | |
| 2013/0212697 A1* | 8/2013 | McKenna | G06F 21/62 726/26 |
| 2013/0298203 A1* | 11/2013 | Ansari | H04L 63/08 726/4 |
| 2014/0150068 A1* | 5/2014 | Janzer | H04L 63/20 726/4 |
| 2014/0289819 A1* | 9/2014 | Lindemann | G06Q 20/42 726/5 |
| 2014/0337836 A1* | 11/2014 | Ismael | G06F 9/455 718/1 |
| 2014/0344927 A1* | 11/2014 | Turgeman | H04W 12/06 726/22 |
| 2016/0099963 A1* | 4/2016 | Mahaffey | H04L 63/1433 726/25 |

\* cited by examiner

| Account No. | Email Address | IP Address | Region | Device Type | Browser Type | Referral Info. |
|---|---|---|---|---|---|---|
| 1 | bob@badsite.com | 111.111.111.111 | 7 | Type 1 | IE | 0 |
| 2 | george@badsite.com | 111.111.111.111 | 7 | Type 1 | IE | 1 |
| 3 | 1xdr45nd@gmail.com | 222.222.222.001 | 3 | Type 2 | Firefox | 0 |
| 4 | 4het98us@gmail.com | 222.222.222.002 | 3 | Type 3 | Safari | 3 |
| 5 | infectious@yahoo.com | 333.333.333.333 | 2 | Type 5 | Safari | 1 |
| 6 | getem@hotmail.com | 111.111.111.022 | 7 | Type 6 | IE | 5 |

FIG. 3

IDENTIFYING RELATED USER ACCOUNTS BASED ON AUTHENTICATION DATA

TECHNICAL FIELD

The disclosure generally relates to anti-malware and antivirus systems.

BACKGROUND

A network-based content management system can store a vast quantity of data (content items) for many thousands of users. Typically, a network content management system allows users to upload, store and retrieve content items to and from the network servers managed by the content management system. Additionally, the content management system can provide functionality that allows one user to share content items managed by the content management system with other users of the service. This content sharing feature can allow a malicious user to share or distribute malicious content to other users of the content management system. Moreover, to avoid detection, a malicious user can create multiple accounts from which to spread malicious content.

To combat the spread of malicious content, a content management system could run a virus scan on each content item uploaded, stored or shared from the storage servers of the service. However, with terabytes, petabytes and even exabytes of data stored, it is not practical for the content management system to run a virus scan on each content item stored at the content management system. Thus, a mechanism is needed by which the content management system can prevent the spread of malicious content (e.g., malware, viruses) and close down malicious user accounts, while not being burdened with scanning every content item stored by the content management system.

SUMMARY

In some embodiments, upon detecting malicious activity associated with a user account, a content management system can identify other user accounts related to the malicious user account. The content management system can identify related user accounts by comparing authentication information corresponding to the malicious user account with authentication information corresponding to other user accounts. Authentication information can include IP address information, geographic information, device type, browser type, email addresses, and/or referral information, for example. The content management system can compare the content items associated with the malicious user account to content items associated with other user accounts to determine relatedness or maliciousness. After identifying related malicious user accounts, the content management system can block all related malicious user accounts.

Particular embodiments provide at least the following advantages: a content management system can detect malicious user accounts without scanning every content item stored at the content management system; and malicious user account detection can be performed using fewer computing resources and less time.

Details of one or more embodiments are set forth in the accompanying drawings and the description below. Other features, aspects, and potential advantages will be apparent from the description and drawings, and from the claims.

DESCRIPTION OF DRAWINGS

FIG. 3 illustrates an example authentication data log.

Like reference symbols in the various drawings indicate like elements.

DETAILED DESCRIPTION

System Overview

Various embodiments of the disclosure are discussed in detail below. While specific embodiments are discussed, it should be understood that this is done for illustration purposes only. A person skilled in the relevant art will recognize that other components and configurations may be used without parting from the spirit and scope of the disclosure.

The disclosed technology addresses the need in the art for identifying related accounts based on authentication data. In some embodiments, a content management system can monitor activity associated with user accounts of the content management system. The content management system can detect malicious activity associated with a user account. In response to detecting the malicious activity, the content management system can compare authentication data associated with the user account to authentication data associated with other user accounts to determine whether the user accounts are related.

Figure 1:
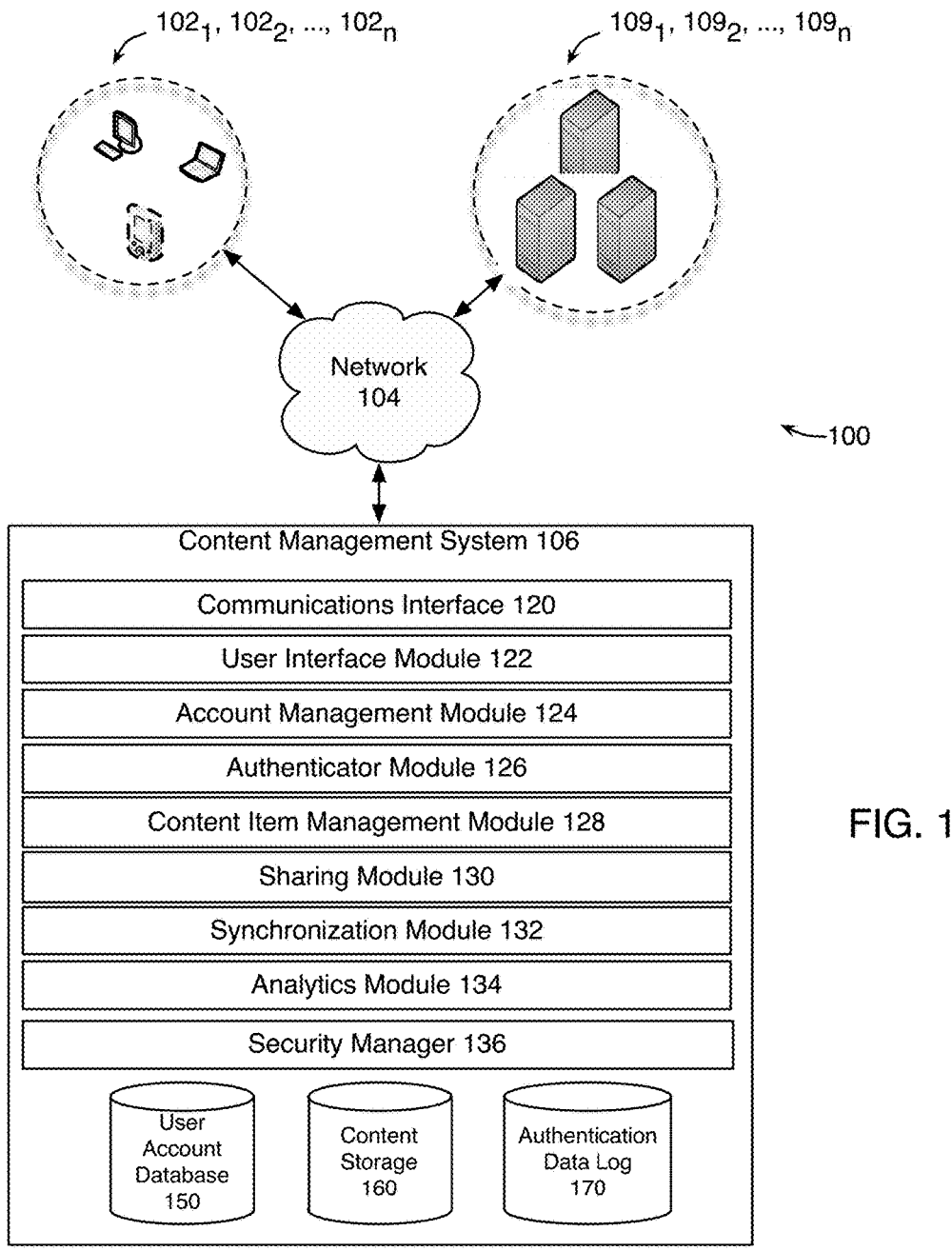
FIG. 1 illustrates an example content management system.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102$_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102$_i$ can upload content to content management system 106 via network 104. The content can later be retrieved from content management system 106 using the same client device 102$_i$ or some other client device 102$_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information. For example, content management system 106 can be configured to collect and store user authentication data, as described in detail below.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device 102$_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated folder (e.g., content library) and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109₁, 109₂, . . . , 109ₙ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

In some embodiments, content management system 106 can include security manager 136. For example, security manager 136 can be configured to identify related accounts based on authentication data stored in authentication data log 170, as described further below.

While content management system 106 is presented with specific components, it should be understood by one skilled in the art, that the architectural configuration of system 106 is simply one possible configuration and that other configurations with more or less components are also possible.

Figure 2:
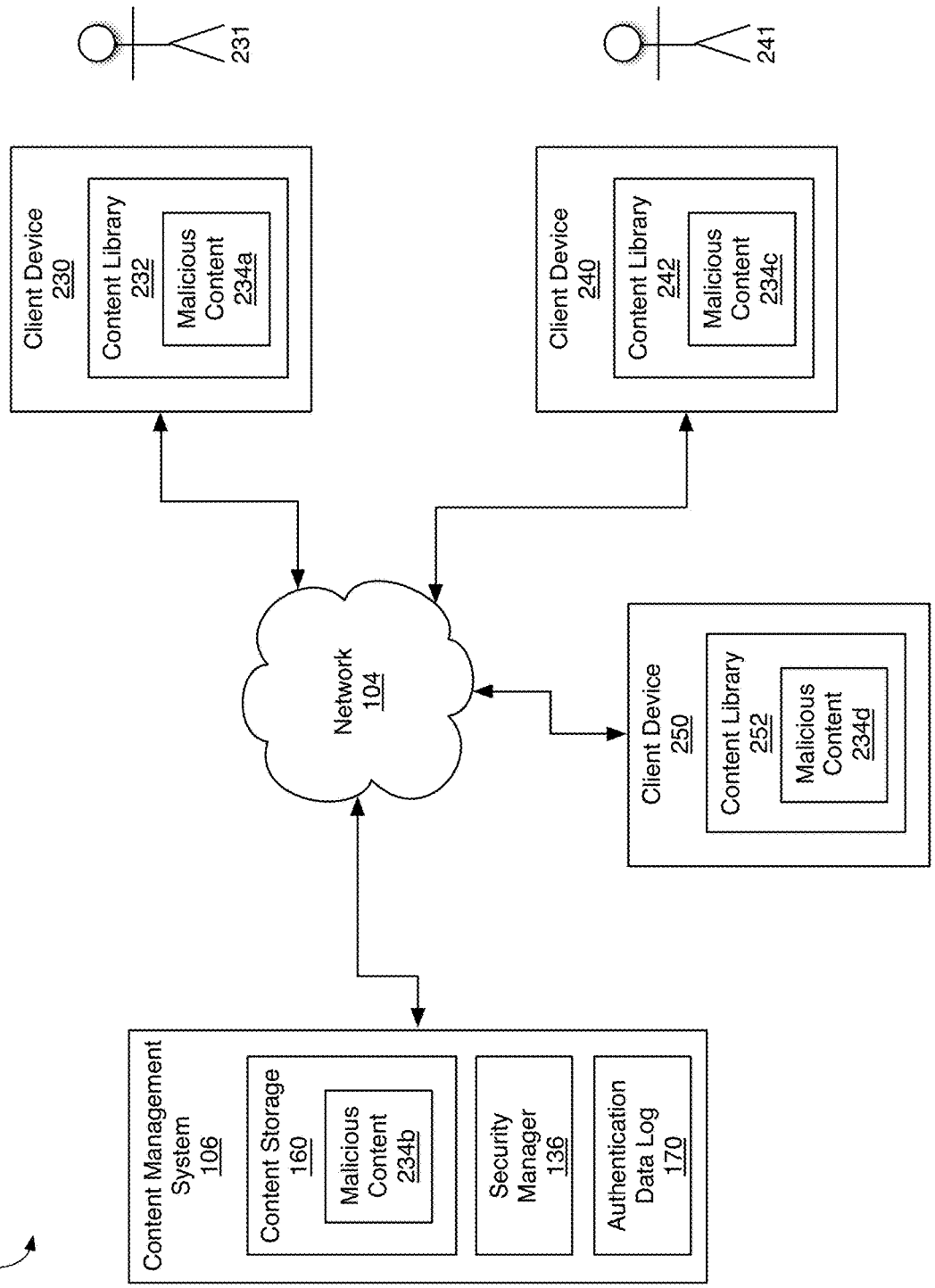
FIG. 2 illustrates an example system for identifying related accounts based on authentication data.

FIG. 2 illustrates an example system 200 for identifying related accounts based on authentication data. For example, system 200 can correspond to system 100 of FIG. 1. As described above, content management system 106 can synchronize content items across multiple user client devices 102 such that the content items stored on each user device 102 are consistent between user devices.

In some embodiments, content management system 106 can include content storage 160 for storing content items associated with user accounts. For example, user 231 can use client device 230 (e.g., corresponding to one of client devices 102, above) to register with content management system 106 through network 104 to create a user account. During registration and subsequent log-ins, content management system 106 can collect authentication information corresponding to user 231's account, such as a user identifier, a password, an IP address of client device 230, an email address for the user, a device type for client device 230, a web browser type, and/or referral information. Content management system 106 can store the authentication information in authentication data log 170, for example.

Once user 231 has created an account with content management system 106, user 231 can place content items stored on client device 230 into content library 232 (e.g., a folder, album, other collection or organization mechanism) to have the content items uploaded and stored in content storage 160. Content items stored in content library 232 can be automatically uploaded to content storage 160 through network 104 when the user places the content items in content library 232, for example. Content items uploaded to content management system 106 from client device 230 and stored in content storage 160 can be associated with a user account corresponding user 231.

In some embodiments, content management system 106 can synchronize content items stored in content storage 160 with multiple client devices. For example, user 241 can register client device 240 and client device 250 (e.g., corresponding to two of client devices 102, above) with content management system 106 to enable synchronizing content between content management system 106 and each client device 240 and 250. When user 241 of client device 240 moves a content item into content library 242, the content item can be automatically uploaded to content storage 160. Content management system 106 can, in turn, send the content item uploaded from client device 240 to client device 250 for storage in content library 252. Thus, content management system 106 can synchronize content libraries 242 and 252 of devices 240 and 250 so that user 241 can access the same content items on each client device 240 and 250.

In some embodiments, a user can share content items in content storage 160 with other users of content management system 106. For example, content management system 106 can allow user 231 to specify content items to share with user 241. User 231 can specify user 241 by user name, account identifier or email address, for example. When user 231 shares a content item associated with the account of user 231 with user 241, the content item can be moved into the account of user 241 on content management system 106. For example, the content item can be copied into or made available to (e.g., by link or by reference) the account of user 241 such that the shared content item is synchronized with the client device 240 of user 241. For example, user 231 of client device 230 can share a content item in content library 232 with user 231 of client device 240. User 231 of client device 230 can share the content item by sending a reference (e.g., link, hyperlink, etc.) to the content item in an email to user 241. User 231 of client device 230 can share the content item by changing permissions or settings of the content item so that the content item is shared with or made available to user 241 of client device 240. User 241, through client device 240, can receive a notification that the content item is being shared with the user 241 of client device 240. User 241 can choose to accept the shared content item by selecting a graphical element presented in the notification, for example. Once user 241 accepts the shared content item, or selects the link in the email, the content item can be added to the account of user 241 and synchronized with content libraries 242 and 252 on client devices 240 and 250 of user 241.

Preventing Distribution of Malicious Content

In some embodiments, content management system 106 can include security manager 136. Security manager 136 can be configured to prevent the spread of malware through content management system 106 by detecting malicious activity and detecting related malicious user accounts. For example, user 231 can be a malicious user. User 231 can store malicious content item 234a in content library 232 on client device 230. Once malicious content item 234a is stored in content library 232, client device 230 can upload malicious content item 234a to content management system 106. Content management system can store malicious content item 234a in content storage 160 (e.g., as malicious content item 234b) the same as any other content item, as described above.

After malicious user 231 adds malicious content item 234a to content library 232 and after client device 230 synchronizes malicious content item 234a with content storage 160 (e.g., as malicious content item 234b), malicious user 231 can share malicious content item 234a with user 241. User 241 can accept shared malicious content item 234a, as described above, to cause malicious content item 234b to be synchronized with client devices 240 and 250. Content management system 106 can download malicious content item 234b to client device 240, which can store the content item as malicious content item 234c, and to client device 250, which can store the content item as malicious content item 234d. When user 241 downloads and/or views malicious content items 234c and/or 234d on client devices 240 and/or 250, client devices 240 and/or 250 can be infected with a software virus or other malware included in malicious content items 234c and 234d that can damage the client devices or steal and transmit sensitive data to user 231. To prevent the spread of malicious content, security manager 136 can be configured to identify related malicious user accounts.

In some embodiments, security manager 136 can scan content items stored on content storage 160 for malicious content. For example, security manager 136 can be configured with policies for triggering a scan (e.g., antivirus scan, anti-malware scan, etc.) of content items stored in content storage 160. When security manager 136 scans a content item and determines that it is a malicious content item, security manager 136 can identify the user account associated with the malicious content item, block the malicious user account and identify other related malicious user accounts, as described in greater detail below.

In some embodiments, security manager 136 can detect malicious activity. For example, a malicious activity can be any activity that will trigger additional investigation by security manager 136. Security manager 136 can detect a malicious activity when a user account is used to store a malicious content item. Security manager 136 can detect a malicious activity when a user account is used to share a malicious content item. Security manager 136 can detect a malicious activity when a user or user account provides referrals to many (e.g., more than a threshold number) new accounts. Security manager 136 can detect a malicious activity when a user account shares more than a threshold number of content items. When security manager 136 detects a malicious activity, security manager 136 can identify the user account associated with the malicious activity, block the malicious user account, and identify other related malicious user accounts, as described in greater detail below.

Authentication Data

FIG. 3 illustrates an example authentication data log 300. In some embodiments, when security manager 136 has identified a malicious content item or has detected a malicious activity associated with a user account (e.g., a malicious user account) of content management system 106, security manager 136 can analyze authentication data log 300 to identify other user accounts that are related to the malicious user account. For example, security manager 136 can prevent the spread of malicious content by blocking the malicious account and related accounts from sharing malicious content items. Authentication data log 300 can correspond to authentication data log 170 stored on by content management system 106, for example.

In some embodiments, security manager 136 can compare authentication information corresponding to a malicious user account to authentication information corresponding to other user accounts to determine whether the other user accounts are also malicious accounts. For example, security manager can compare the email address, IP address, geographic region, device type, browser type and/or referral information logged in authentication data log 300 for the identified malicious user account to the email address, IP address, geographic region, device type, browser type and/or referral information logged in authentication data log 300 for other user accounts.

In some embodiments, security manager 136 can determine that user accounts are related when the user accounts are associated with the same Internet protocol (IP) address. For example, security manager 136 can identify account number 1 in log 300 a malicious user account when security manager 136 detects or identifies a malicious content item associated with account number 1, as described above. When security manager 136 identifies account number 1 as a malicious user account, security manager 136 can compare the IP address for account number 1 with the IP addresses of other user accounts logged in authentication data log 300 to determine which other user accounts use the same IP address. For example, by comparing the IP address for account number 1 (e.g., 111.111.111.111) to the IP address for account number 2 (e.g., 111.111.111.111), security manager 136 can determine that account number 1 and account number 2 are using the same IP address to log in to content management system 106. Based on the determination that account number 1 and account number 2 are using the same IP address, security manager 136 can determine that account number 1 and account number 2 are related accounts.

In some embodiments, security manager 136 can determine that user accounts are related when the user accounts are associated with similar Internet protocol (IP) addresses. Continuing the example above, when security manager 136 identifies account number 1 as a malicious user account, security manager 136 can compare the IP address for account number 1 with the IP addresses of other user accounts logged in authentication data log 300 to determine which other user accounts use similar IP addresses (e.g., same IP subnet, same IP prefix, etc.). For example, by comparing the IP address for account number 1 (e.g., 111.111.111.111) to the IP address for account number 6 (e.g., 111.111.111.022), security manager 136 can determine that account number 1 and account number 2 are using the same IP address prefix but different IP addresses to log in to content management system 106. Based on the determination that account number 1 and account number 2 are using similar IP addresses (e.g., the same IP address prefix), security manager 136 can determine that account number 1 and account number 2 are related accounts.

In some embodiments, security manager 136 can determine that user accounts are related when the user accounts are associated with the same device type. For example, the device type information can include the manufacturer of the user's device, the hardware configuration of the user's device, the operating system of the user's device, and/or the mac address for the user's device, among other things. Continuing the example above, when security manager 136 identifies account number 1 as a malicious user account, security manager 136 can compare the device type information for account number 1 with the device type information of other user accounts logged in authentication data log 300 to determine which other user accounts use the same device type. For example, by comparing the device type for account number 1 (e.g., type 1) to the device type for account number 2 (e.g., type 1), security manager 136 can determine that account number 1 and account number 2 are using the same type of device to log in to content management system 106. Based on the determination that account number 1 and account number 2 are using the same device type, security manager 136 can determine that account number 1 and account number 2 are related accounts.

In some embodiments, security manager 136 can determine that user accounts are related when the user accounts are associated with the same web browser type. For example, web browser type information can include the manufacturer of the web browser and/or the version number of the web browser. Continuing the example above, when security manager 136 identifies account number 1 as a malicious user account, security manager 136 can compare the web browser type information for account number 1 with the web browser type information of other user accounts logged in authentication data log 300 to determine which other user accounts use the same web browser type. For example, by comparing the web browser type for account number 1 (e.g., Internet Explorer) to the web browser type for account number 2 and account number 6 (e.g., Internet Explorer), security manager 136 can determine that account number 1, account number 2, and account number 6 are using the same type of web browser to log in to content management system 106. Based on the determination that account number 1, account number 2 and account number 6 are using the same web browser type, security manager 136 can determine that account number 1, account number 2 and account number 6 are related accounts.

In some embodiments, security manager 136 can determine that user accounts are related when the user accounts are associated with the same email domain. Continuing the example above, when security manager 136 identifies account number 1 as a malicious user account, security manager 136 can compare the email account domain for account number 1 with the email account domain of other user accounts logged in authentication data log 300 to determine which other user accounts use the same email account domain. For example, by comparing the email account domain for account number 1 (e.g., badsite.com) to the email account domain (e.g., badsite.com) for account number 2, security manager 136 can determine that account number 1 and account number 2 are using the same email account domain to log in to content management system 106. Based on the determination that account number 1 and account number 2 are using the same email account domain, security manager 136 can determine that account number 1 and account number 2 are related accounts.

In some embodiments, security manager 136 will analyze email account domain data in authentication data log 300 when the email account domain is an uncommon domain. For example, common email account domains (e.g., gmail.com, yahoo.com, etc.) are used by millions of users; the use of these common domains may not be a very good indicator of a malicious user account. However, uncommon email domains (e.g., badsite.com) will only be used by a small number of users and therefore may be a better indicator of other malicious user accounts when a malicious user account has already been identified and associated with the uncommon email domain. Security manager 136 can identify an email domain as an uncommon email domain when less than a threshold percentage (e.g., less than 1%, less than 5%, etc.) of accounts created for content management system 106 are associated with the email domain, for example. Alternatively, security manager 136 can maintain a white list of common email domains (e.g., configured by an administrator). In some embodiments, security manager 136 will only analyze email account domain data in data log 300 when the email domain associated with a malicious user account is not in the white list.

In some embodiments, security manager 136 can determine that user accounts are related when the user accounts are associated with the same geographic region. For example, content management system 106 can determine the geographic region (e.g., area, country, etc.) associated with the user account based on the location of the account IP address and/or the location of network access points used to connect the user's device to content management system 106. Continuing the example above, when security manager 136 identifies account number 1 as a malicious user account, security manager 136 can compare the geographic region for account number 1 with the geographic region of other user accounts logged in authentication data log 300 to determine which other user accounts are associated with the same geographic region. For example, by comparing the geographic for account number 1 (e.g., region 7) to the geographic region for account number 2 (e.g., region 7), security manager 136 can determine that account number 1 and account number 2 are accessing content management system 106 from the same geographic region. Based on the determination that account number 1 and account number 2 are using the same geographic region, security manager 136 can determine that account number 1 and account number 2 are related accounts.

In some embodiments, security manager 136 can determine that user accounts are related when the user accounts have similar email address naming patterns. For example, security manager 136 can use string pattern matching to determine when user account email addresses have been automatically generated using the same email account creation mechanism. For example, at first glance, the email address for account number 3 (e.g., 1xdr45nd@gmail.com) and the email address for account number 4 (e.g., 4het98us@gmail.com) do not appear to be related. However, both email accounts use the same pattern for the email addresses (e.g., one number, three letters, two numbers, two letters). When security manager 136 compares the email address for account number 3 to account number 4, security manager 136 can determine that both email addresses use the same pattern for naming their respective email addresses. Based on the determination that both email addresses use the same string pattern, security manager 136 can determine that account number 3 and account number 4 are related accounts.

In some embodiments, security manager 136 can determine that user accounts are related when the user accounts are associated with similar referral accounts or are in the same referral chain. For example, when security manager 136 determines that account number 1 is a malicious account, security manager 136 can analyze authentication log 300 to determine which user account referred account number 1 and/or which user account received a referral from account number 1. By analyzing log 300, security manager 136 can determine that account number 1 was not referred to content management system 106 by another account because the referral account number is zero and there is no zero account number. Security manager 136 can determine, however, that account number 1 provided a referral for account numbers 2 and 5. Thus, security manager 136 can determine that account numbers 2 and 5 are related to malicious account number 1. Additionally, security manager 136 can determine that account number 5 provided a referral to account number 6. Security manager 136 can determine that account number 6 is related to accounts 1, 2 and 5 because account number 6 is linked to accounts 1, 2 and 5 through the referral from account number 5. Thus, security manager 136 can identify a referral chain (e.g., account numbers 1, 5 and 6) by identifying links (e.g., account number 5) between accounts and can identify the accounts in the referral chain as related accounts.

In some embodiments, security manager 136 can determine that user accounts are related when the user accounts include the same or similar content. For example, when security manager 136 determines that account number 1 is a malicious account, security manager 136 can generate hash values for content items associated with account number 1. Security manager 136 can compare the hash values to hash values generated for other content items in other user accounts to determine whether the other user accounts include the same or similar content items. If another account includes the same or similar content items as the malicious account number 1, then security manager 136 can identify the other account as being related to the malicious user account.

In the embodiments described above, security manager 136 can analyze items of authentication data logged in authentication log 300 individually to search for and identify related malicious accounts. However, to improve the accuracy of detecting related malicious accounts and to avoid labeling a user's account as a malicious account when it may not be, in some embodiments, security manager 136 can analyze any combination of the authentication data items logged in authentication log 300. For example, security manager 136 can use two or more items of authentication data logged in authentication data log 300 to determine related user accounts. Security manager 136 can, for example, determine that a user account is related to an identified malicious account when the user account and the identified malicious account have the same email domain and have related referral accounts. Security manager 136 can, for example, determine that a user account is related to an identified malicious account when the user account and the identified malicious account have the same email string pattern, device type and browser type. Security manager 136 can, for example, determine that a user account is related to an identified malicious account when the user account and the identified malicious account have the same IP address and the accounts are associated with the same or similar content items.

In some embodiments, once the malicious user account and the related malicious accounts are identified, security manager 136 can block the malicious user accounts. For example, security manager 136 can delete or otherwise prevent access to the initially detected malicious user account and all user accounts related to the malicious user account.

Example Process

Figure 4:
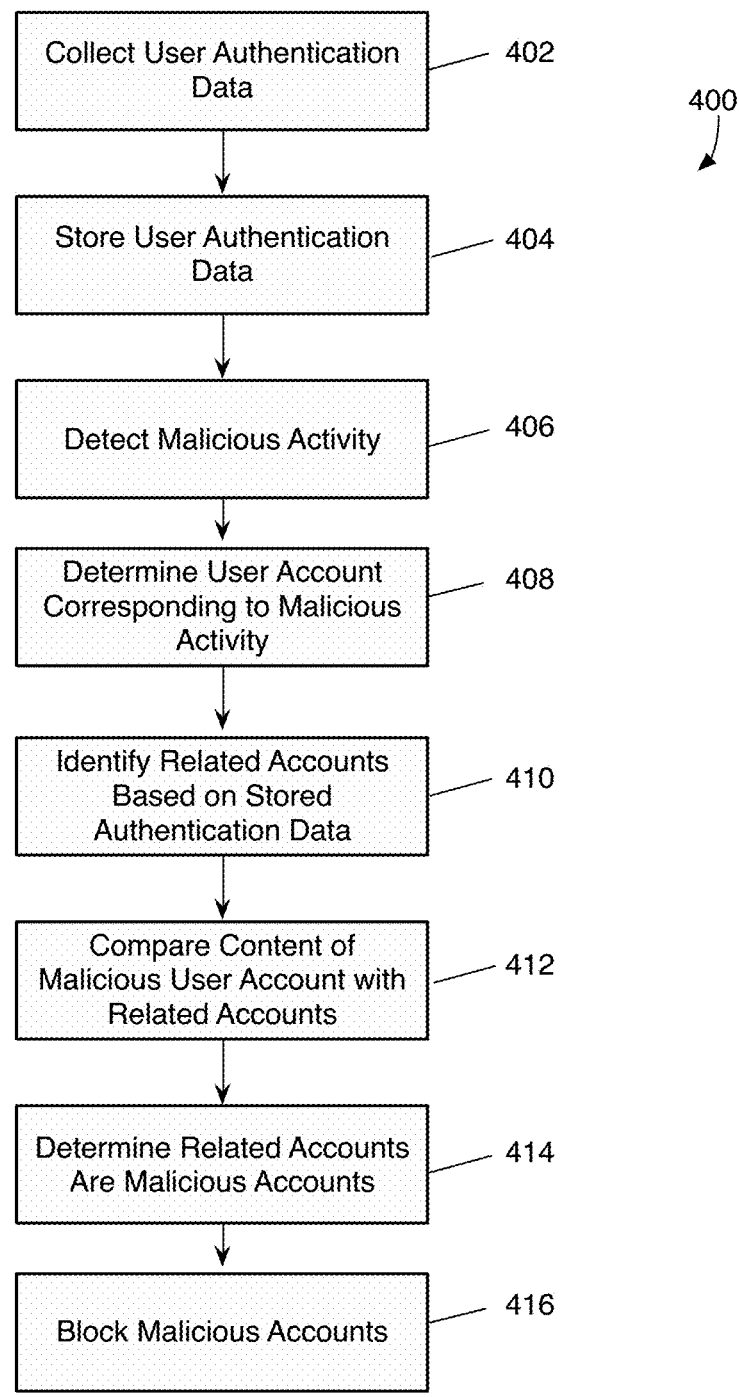
FIG. 4 is a flow diagram of an example process for identifying related accounts based on authentication data.

FIG. 4 is a flow diagram of an example process 400 for identifying related accounts based on authentication data. At step 402, content management system 106 on can collect user authentication data. For example, when a user creates an account with content management system 106, the user can provide authentication information to content management system 106, such as an email address and referral information. Additionally, content management system 106 can obtain or derive authentication information, such as the user's IP address, geographic region, device type and browser type from IP packets received by content management system 106 from the user's device. Alternatively, content management system 106 can send a request for device type and browser type to the user's device and receive the device type and browser type information in a response to the request.

At step 404, content management system 106 can store the user authentication data. For example, content management system 106 can store the user authentication data in authentication log 300 of FIG. 3.

At step 406, content management system 106 can detect malicious activity associated with a user account. For example, content management system 106 can include security manager 136. Security manager 136 can scan content items stored in content storage 160 with antivirus and/or anti-malware software to determine if the content items include malicious content. Security manager 136 can monitor account referrals and detect malicious activity when a user account refers too many (e.g., greater than a threshold number) other user accounts. Security manager 136 can detect malicious activity when the number of content items shared by a user account exceeds a threshold number, for example.

At step 408, content management system 106 can determine a user account corresponding to the malicious content. For example, security manager 136 can determine which user account is responsible for uploading the malicious content to content management system 106. Security manager 136 can determine which user account is associated with the malicious content item stored in content storage 160 and identify that user account as a malicious user account.

At step 410, content management system 106 can identify accounts related to the malicious user account based on the stored authentication data. For example, security manager 136 can compare the authentication data stored for the malicious user account with authentication data stored for other accounts. If at least a portion of the malicious account authentication data matches authentication data of another user account, security manager 136 can determine that the other user account is related to the malicious user account.

At step 412, content management system 106 can compare the content items associated with the malicious user account with the related accounts. For example, security manager 136 can generate hash values for content items in the malicious user account and compare the hash values to hash values generated for content items in the related accounts. For example, security manager 136 can generate a hash value for each content item in the malicious account. Security manager 136 can generate multiple hash values for each content item in the malicious account; each hash value can correspond to a portion of the content item.

At step 414, content management system 106 can determine that the related account is a malicious account. For example, if the hash values generated from content in the malicious user account match the hash values generated from content in the related user account, then security manager 136 can determine that the related user account is a malicious user account. For example, a match can be determined when one or more of the hash values generated from content in the malicious user account are equal to one or more of the hash values generated from content in the related user account.

In some embodiments, if the hash values do not match, security manager 136 can determine that the related account is a malicious account based on the authentication data. For example, if the email address or IP address of the malicious account is the same as the email address or IP address of the related account, security manager 136 can determine that the related account is a malicious account based on that data alone. Other authentication data (e.g., device type, geographic region, browser type, etc.) individually may not be strong enough evidence of relatedness to identify the related account as a malicious account. However, if several (e.g., two or more) items of authentication data are the same between the malicious user account and the related user account, security manager 136 can identify the related account as a malicious account.

At step 416, content management system 106 can block the identified malicious accounts. For example, content management system 106 can delete or prevent access to user accounts that have been identified as malicious accounts using the mechanisms described above.

Example System Architecture

Figure 5A:
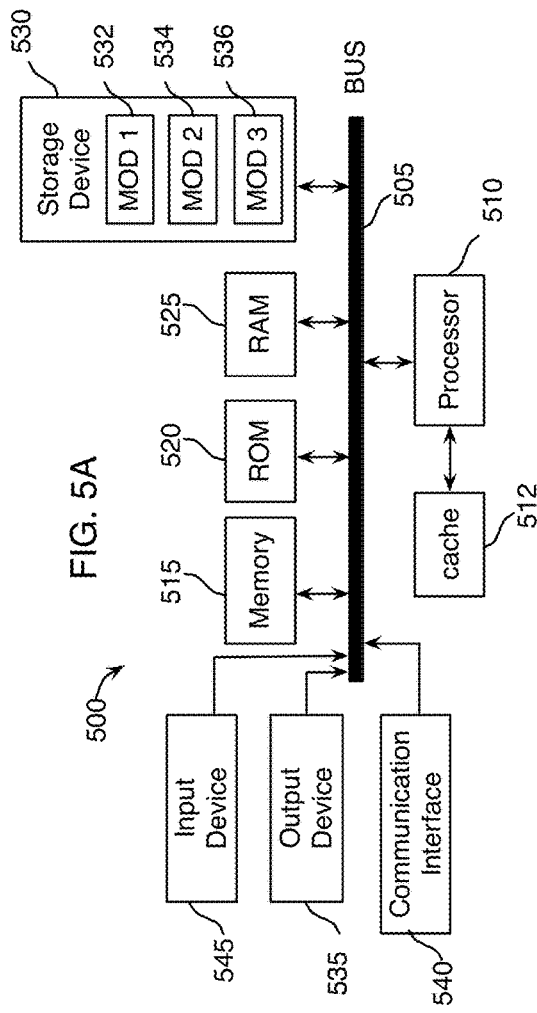
FIG. 5A and FIG. 5B illustrate example system embodiments for implementing the systems and processes of FIGS. 1-4.
Figure 5B:
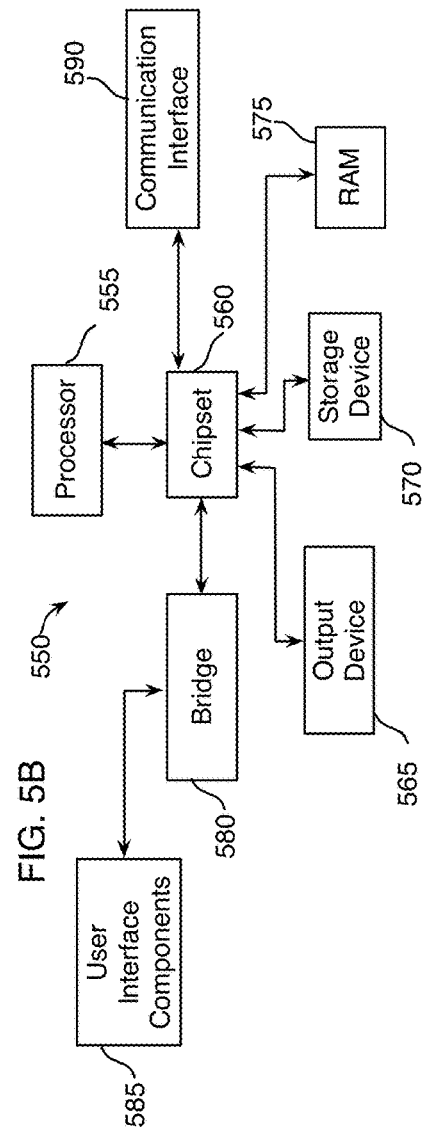

FIG. 5A and FIG. 5B illustrate example system embodiments for implementing the systems and processes of FIGS. 1-4. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of embodiments. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    detecting, by a computing device, one or more content items stored in a folder on a client device associated with a first activated user account, wherein the folder of the client device is synchronized to a storage device hosted on the computing device;
    uploading the each of the one or more content items stored in the folder on the client device to the storage device hosted on the computing device, such that the first activated user account can access each of the one or more content items on both the client device and another client device associated with the first activated user account;
    detecting, by a computing device, a malicious activity associated with the first activated user account;
    scanning each of the one or more content items to identify malware contained in at least one content item of the one or more content items, responsive to detecting the malicious activity associated with the first activated user account;
    in response to identifying malware contained in the at least one content item identifying, by the computing device, that at least the second activated user account of the computing device is related to the first activated user account based on at least authentication data associated with the first activated user account and the second activated user account, wherein the authentication data are stored on the computing device and the authentication data includes a referral account identifier linking the second activated user account to the first activated user account; and
    blocking access of the first activated user account or the at least one second activated user account to the storage device hosted on the computing device.

2. The method of claim 1, further comprising:
    collecting, by the computing device, authentication data associated with the first activated user account and the second activated user account, the authentication data including an email address; and
    determining that the second activated user account is related to the first activated user account based on a common string pattern in the first activated user account email address and the second activated user account email address.

3. The method of claim 1, further comprising:
    collecting, by the computing device, authentication data associated with the first activated user account and the second activated user account, the authentication data including an IP address; and
    determining that the second activated user account is related to the first activated user account based on at least a first portion of the first activated user account IP address matching at least a portion of the second activated user account IP address.

4. The method of claim 1, further comprising:
    collecting, by the computing device, authentication data associated with the first activated user account and the second activated user account, the authentication data including a geographic region; and
    determining that the second activated user account is related to the first activated user account based on the first activated user account geographic region matching the second activated user account geographic region.

5. The method of claim 1, further comprising:
    collecting, by the computing device, authentication data associated with the first activated user account, the authentication data including a device type; and
    determining that the second activated user account is related to the first activated user account based on the first activated user account device type matching the second activated user account device type.

6. The method of claim 1, further comprising:
    collecting, by the computing device, authentication data associated with the first activated user account, the authentication data including a browser type; and
    determining that the second activated user account is related to the first activated user account based on the first activated user account browser type matching the second activated user account browser type.

7. A non-transitory computer readable medium including one or more sequences of instructions which, when executed by one or more processors, cause:
    collecting a first authentication data associated with a first activated user account of a computing device;
    collecting a second authentication data associated with a second activated user account of the computing device;
    detecting, by a computing device, one or more content items stored in a folder on a client device associated with the first activated user account, wherein the folder of the client device is synchronized to a storage device hosted on the computer-readable medium;
    uploading each of the one or more content items stored in the folder on the client device to the storage devices hosted on the computing device, such that the first activated user account can access each of the one or more content items on both the client device and another client device associated with the first activated user account;
    detecting a malicious activity associated with the first activated user account;
    scanning each of the one or more content items to identify malware contained in at least one content item of the one or more content items, responsive to detecting the malicious activity;
    in response to identifying malware contained in the at least one content item, comparing the first authentication data to the second authentication data, the second authentication data comprising a referral account identifier linking the second activated user account to the first activated user account;
    determining that the second activated user account is related to the activated user account based on the comparison; and
    blocking access of the first activated user account or the at least one second activated user account to a content item stored in the storage device by modifying the security setting of the content item.

8. The non-transitory computer readable medium of claim 7, wherein the first authentication data includes a first email address, the second authentication data includes a second email address; and wherein the instructions cause:
determining that the first email address and the second email address have a common string pattern.

9. The non-transitory computer readable medium of claim 7, wherein the first authentication data includes a first IP address, the second authentication data includes a second IP address; and
wherein the instructions cause:
determining that at least a portion of the first IP address matches at least a portion of the second IP address.

10. The non-transitory computer readable medium of claim 7, wherein the first authentication data includes a first geographic region, the second authentication data includes a second geographic region; and wherein the instructions cause:
determining that the first geographic region matches the second geographic region.

11. The non-transitory computer readable medium of claim 7, wherein the first authentication data includes a first device type, the second authentication data includes a second device type; and wherein the instructions cause:
determining that the first device type matches the second device type.

12. The non-transitory computer readable medium of claim 7, wherein the first authentication data includes a first browser type, the second authentication data includes a second browser type; and
wherein the instructions cause:
determining that the first browser type matches the second browser type.

13. A system comprising:
one or more processors; and
a computer readable medium including one or more sequences of instructions which, when executed by one or more processors, cause:
collecting a first authentication data associated with a first activated user account of a computing device and a second authentication data associated with a second activated user account of the computing device, the second activated user account comprising a referral account identifier;
detecting one or more content items stored in a folder on a client device associated with a first activated user account, wherein the folder of the client device is synchronized to a storage device hosted on the system;
uploading each of the one or more content items stored in the folder on the client device to the storage device hosted on the system, such that the first activated user account can access each of the one or more content items on both the client device and another client device associated with the first activated user account;
detecting a malicious activity associated with the first activated user account;
scanning each of the one or more content items to identify malware contained in at least one content item of the one or more content items;
comparing, in response to identifying malware contained in the at least one content item, the at least one content item of the first activated user account to one or more second content items associated with the second activated user account;
determining that the second activated user account is related to the first activated user account based on a result of the comparing and the referral account identifier linking the second activated user account to the first activated user account;
determining that the second activated user account is a malicious user account based on a result of the comparing; and
blocking access of the first activated user account or the at least one second activated user account to the at least one content item on the computing device by modifying the security setting of the at least one content item.

14. The system of claim 13, wherein the instructions cause:
generating one or more first hash values based on a first content item of the at least one content item;
generating one or more second hash values based on a second content item of the one or more second content items;
comparing the first hash values to the second hash values; and
determining that the second activated user account is a malicious user account based on the result of the comparing.

15. The system of claim 13, wherein the first authentication data includes a first email address, the second authentication data includes a second email address; and
wherein the instructions cause:
determining that the first email address and the second email address have a common string pattern.

16. The system of claim 13, wherein the first authentication data includes a first IP address, the second authentication data includes a second IP address; and
wherein the instructions cause:
determining that at least a portion of the first IP address matches at least a portion of the second IP address.

17. The system of claim 13, wherein the first authentication data includes a first geographic region, the second authentication data includes a second geographic region; and
wherein the instructions cause:
determining that the first geographic region matches the second geographic region.

18. The method of claim 1, wherein the blocking comprises:
modifying the security setting of the content item with respect to the first activated user account or the at least second activated user account.

19. The method of claim 1, wherein the blocking comprises:
removing the first activated user account or the at least second activated user account.

* * * * *